(12) United States Patent
Fehrenbacher et al.

(10) Patent No.: US 8,139,705 B2
(45) Date of Patent: Mar. 20, 2012

(54) SCREENED CHAMBER FOR ION THERAPY

(75) Inventors: Georg Fehrenbacher, Mühital (DE); Frank Gutermuth, Bensheim (DE); Torsten Radon, Ober-Mörlen (DE)

(73) Assignee: GSI Helmholtzzentrum für Schwerionenforschung GmbH, Darmstadt (DE)

( * ) Notice: Subject to any disclaimer, the term of this patent is extended or adjusted under 35 U.S.C. 154(b) by 0 days.

(21) Appl. No.: 11/046,648

(22) Filed: Jan. 28, 2005

(65) Prior Publication Data
US 2005/0218348 A1 Oct. 6, 2005

Related U.S. Application Data

(63) Continuation-in-part of application No. PCT/EP03/07304, filed on Jul. 8, 2003.

(30) Foreign Application Priority Data

Aug. 1, 2002 (DE) .................................. 102 35 116

(51) Int. Cl.
*G21G 1/10* (2006.01)
*G21C 11/02* (2006.01)

(52) U.S. Cl. .................. 376/192; 250/517.1; 250/518.1; 250/492.3; 376/190

(58) Field of Classification Search .................. 376/158, 376/458, 346, 340; 250/506.1, 515.1, 518.1, 250/503.1, 492.1; 600/1; D24/158
See application file for complete search history.

(56) References Cited

U.S. PATENT DOCUMENTS

| | | | | |
|---|---|---|---|---|
| 2,991,368 A * | 7/1961 | Reissner | .................... | 250/518.1 |
| 3,995,163 A * | 11/1976 | Colditz | ...................... | 250/506.1 |
| 4,870,287 A * | 9/1989 | Cole et al. | .................. | 250/492.3 |
| 5,585,642 A * | 12/1996 | Britton et al. | .............. | 250/492.3 |
| 5,703,918 A * | 12/1997 | Hiismaki et al. | .............. | 376/458 |
| 6,252,921 B1* | 6/2001 | Michaudon | .................... | 376/156 |
| 6,294,791 B1* | 9/2001 | Williams et al. | ......... | 250/455.11 |
| 6,529,577 B1* | 3/2003 | Allen et al. | ..................... | 378/69 |
| 6,674,829 B1* | 1/2004 | Skold | ............................ | 376/346 |
| 6,894,300 B2* | 5/2005 | Reimoser et al. | .......... | 250/505.1 |
| 6,927,407 B2* | 8/2005 | Bruchle et al. | ............. | 250/518.1 |

FOREIGN PATENT DOCUMENTS

DE 195 17 415 11/1996

(Continued)

OTHER PUBLICATIONS

Stekl et al. Monte-Carlo study of different concepts for the ATLAS experiment forward region shielding. Nuclear Instruments and Methods in Physics Research A 493 (2002) 199-207.*

(Continued)

*Primary Examiner* — Johannes P Mondt
(74) *Attorney, Agent, or Firm* — DeMont & Breyer, LLC

(57) ABSTRACT

In a shielded chamber for neutron therapy including a therapy room which has a central beam axis along which a high-energy therapy beam is introduced into the Chamber through one end wall thereof and which includes at the opposite end a labyrinth entrance with at least two shielding wall sections displaced longitudinally along the central beam axis and extending into the room from opposite side walls, the wall sections include structures for causing spallation to thereby generate from the high energy neutrons in the high energy neutron beam a plurality of low energy neutrons which are then moderated by the wall sections.

14 Claims, 2 Drawing Sheets
(1 of 2 Drawing Sheet(s) Filed in Color)

FOREIGN PATENT DOCUMENTS

EP        0986 070        3/2000

OTHER PUBLICATIONS

Mutic et al. Room shielding for intensity-modulated radiation therapy treatment facilities. Int. J. Radiation oncology Biol. PHys., vol. 50, No. 1, p. 239-246, 2001.*

Debus "Proposal for dedicated ion beam facility for cancer therapy", DKFZ, GSI, and FZR Report, 1998.*

Thomas "Radiological protection at accelerators" in Handbook of Accelerator Physics and Engineering, Edited by Chao and Tigner, World Scientific, 1999.*

Hudek, "Simulation of Transmission and Attenuation of Photons in a Labyrinth", SLAC-TN-04-065, Sep. 2004.*

Amaldi, "The Italian hadrontherapy project CNAO", 1st International Workshop on Space Radiation Research and 11th Annual NASA Space Radiation Health Investigators' Workshop Arona (Italy), May 27-31, 2000.*

De Conto, "Etoile: The Hadrontherapy Project for Lyon (France)", Proceedings of EPAC 2002, Paris, France, 2002.*

H. Eickhoff, "Tests of a Light-Ion Gantry Section as an Example of Preparations for the Therapy Facility in Heidelberg", Proceedings of EPAC 2002, Paris, France, 2002.*

Abstract of Sisterson et al, "Proton production cross sections for 14C from silicon and oxygen: implication for cosmic-ray studies", Nuclear Instruments and Methods in Physics Research B92, pp. 510-512 (issues 1-4, Jun. 3, 1994).*

S. Agosteo, "Radiation Protection At Medical Accelerators", *Radiation Protection Dosimetry*, vol. 96, No. 4, pp. 393-406 (2001) Nuclear Technology Publishing.

A. Brahme et al., "Design of a Center for Biologically Optimised Light Ion Therapy in Stockholm", *Nuclear Instruments & Methods in Physics Research, Section-B: Beam Interactions with Materials and Atoms*, North Holland Publishing company, Amsterdam, NL, vol. 184, No. 4, pp. 569-588, Dec. 2001.

J. Debus, "Proposal for a Dedicated Ion Beam Facility for Cancer Therapy"; DKFZ, GSI, and FZR Report, 1998.

Din 6847/ Teil 2, "Strahlenschutzregeln Für Die Einrichtung Vone Medizinischen Elektronenbeschleunigeranlagen". Kapitel 8. 7, Bemessung der Abschirrnung von Neutronenstrahiung, Mar. 1990.

A. Fasso et al., "New Developments in Fluka Modelling Hardonic and Em Interactions Proc.", 3$^{rd}$ Workshop on Simulating Accelerator Radiation Environments Kek. Tsukuba, Japan. 1997.

A. Fasso et al., "Abschmirung Gegen Hochenergetjsche Sttrahlung", Landoit-Börnstein, band 11, 1990.

* cited by examiner

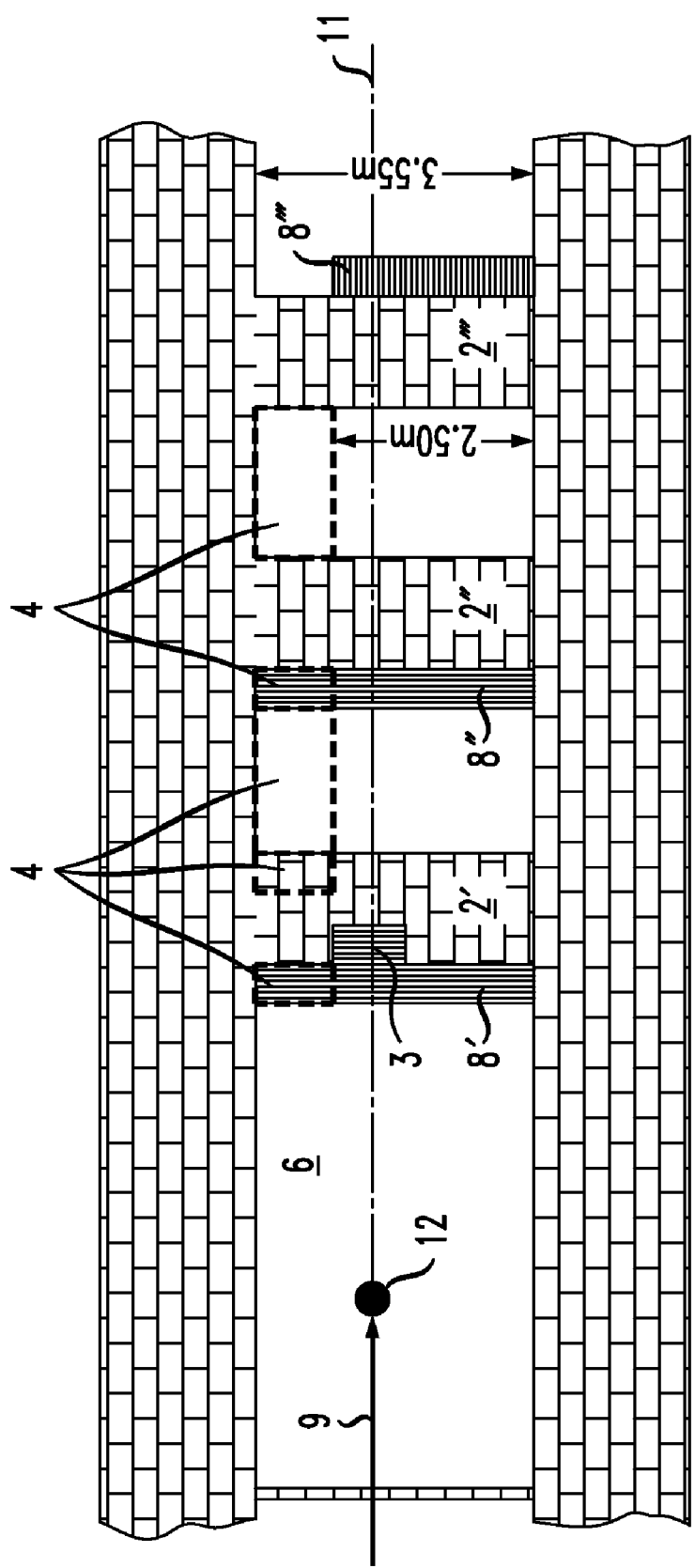

SCREENED CHAMBER FOR ION THERAPY

This is a Continuation-In-Part Application of international application PCT/EP03/007304 filed Jul. 8, 2003 and claiming the priority of German patent application 102 35 116.3 filed Aug. 1, 2002.

BACKGROUND OF THE INVENTION

The invention relates to a screened therapy Chamber for ion therapy, the chamber being for shielding neutrons having an energy up to GeV, wherein the therapy Chamber is shielded at all but one side, which includes a labyrinth-like shielded access.

In Germany and other European countries, therapeutic medical accelerators for highly energetic ion radiation are under development [I]. For the design of such high energy ion accelerators for cancer therapy, however, there is a problem in that ion accelerators produce secondary radiation during slowing down of the ions in the accelerator structures, in biological and other targets, in particular in the patient when irradiated. The main component of the secondary radiation is neutron radiation. The primary beam is accelerated and transported to the target.

The following processes result in the production of neutrons forming secondary radiation:
beam losses by charge conversion,
beam losses by charge transfer,
beam losses by interaction with the residual gas in a partial vacuum,
losses during deflection and inflection procedures extraction and injection,
during slowing down of the ion beam in the tissue or another material.

The unavoidable secondary radiation, that is, the neutron radiation must be shielded. The radiation levels generated as source radiation are substantial; they are at a level of up to Sv/h. The radiation level tolerable outside the radiation shield is at a $\mu$Sv/h level, depending on the definition for the areas outside the radiation shield, for example, according to German radiation protection rules surveillance or control areas. Consequently, the neutron radiation dose must be reduced by about 6 orders of magnitude.

A heavy ion therapy unit in a hospital environment needs to comply with the requirements of the radiation protection rules, that is, areas adjacent to the therapy rooms are to be defined as surveillance areas, in which the 1-mSv-limit per year is met with negligible emissions from radioactive materials.

Conventional therapy installations wherein patients are irradiated with X-ray or gamma radiation are arranged in radiation bunkers in such a way that concrete walls shield the primary radiation such as the stray radiation in such a way that the surrounding areas do not have an increased radiation level.

Radiation therapy has been performed so far using radiation from gamma radiation sources such as 137-Cs, 60-Co, or X-radiation generated by electron accelerators. The radiation protection obtained by walls serves therefore for the shielding of gamma and X-radiation. For electron accelerators with high end energies of up to 50 MeV, the neutron radiation generated by the nuclear photo effect must be shielded. Authoritative control rules for the design of the neutron shields are the DIN norms (German Industry Norms) DIN 6847/part 2 [II], the publication of the NCRP (National Council on Radiation Protection and Measurements) and, for high energy particle accelerators in basic research, the reference book Landolt-Börnstein [III].

The general procedure for the shielding of neutron radiation is the use of hydrogen-containing substances such as water, concrete and water-containing minerals. Materials such as lead or iron used for the shielding of X- and gamma radiation are not particularly suitable to absorb or moderate neutrons. For direct neutron radiation in accordance with DIN 6847, part 2, [II], the following tenth-value layer thickness for the area of mechanical irradiation units are given for a limit of 1 mSv per year, with negligible emissions of radioactive materials:

| Material | Water paraffin | Concrete | Iron, lid |
| --- | --- | --- | --- |
| Tenth value thickness | 10-15 cm | 16-25 cm | 42 cm |

Because of insufficient absorption and moderation of neutrons with energies of up to 3 MeV, the effectiveness of metals is insufficient so that additional hydrogen-containing absorbers must be used.

The shielding effect $H(d)/H_0$ of a wall with a thickness of d and a minimum thickness of ($d>d_0$) is for a neutron beam with an energy $E_n$:

$$\frac{H(d)}{Ho} = \frac{1}{r^2} \cdot \exp\left(-\frac{d}{\lambda(E_n, \vartheta)}\right)$$

With the characteristic moderating constant 2, which depends on the energy $E_n$ of the neutron radiation and the angle relative to the incident beam, the distance r to the source location the shield thickness d and the source strength $H_0$, which depends on the primary beam and the target.

Generally, the shielding effect is higher with copper than with concrete except for neutrons with energies of 3 MeV or less. The shielding however should be such that it is effective for all neutron energies as they may occur with the transport of the source neutrons through the shield so that shielding must be present which is effective for all neutron energies.

The radiation protection arrangements of the radiation therapy installations built up to now concentrate in the shielding of neutron components in the energy range of the neutrons of about 10 MeV. Herein, concrete alone is generally a sufficiently effective radiation protection for all types of radiation. The difference in the shielding effectiveness of metals and concrete is small over a wide energy range that is an energy range of 3 to 30 MeV.

The newest radiation protection plans for the Italian ion therapy project TERA were done by Agosteo et al. [IV]. Herein the planning is based on carbon ions. For the design of the radiation protection features, neutron spectra are used as they are used also in the present case. Agosteo developed on the basis of the measured neutron spectrums and the transport of the neutrons—using the radiation transport program FLUKA [V]—with a simplified geometry, for example, a spherical geometry, a model which permits an estimation of the attenuation of the neutron radiation in such simplified arrangements. The model describes essentially the dose caused by direct radiation. increased doses to be expected as a result of stray radiation are difficult to estimate with such models.

Heavy ion therapy installations which provide depth therapy with carbon ions require accelerated ions with energies of up to about 400 MeV per nucleon. The neutron radiation generated during moderation of the ions in the tissue has energies of up to about 1000 MeV. Such high-energetic neutron radiation is difficult to shield particularly with conventional shielding materials. The attenuation length of neutrons with energies in excess of 100 MeV in normal concrete of the density of 2.3 g/cm$^3$ is 45 to 52 cm. The tenth value thickness is about 100 cm. The physical parameters of an ion therapy installation differ substantially from those of a conventional X-ray irradiation installation. The primary beam including protons, carbon ions, oxygen ions is precisely guided from the generation during the acceleration up to the deposition in the tissue and is not much scattered like X-ray beams, but, during moderation, highly energetic neutrons are generated. For example, a carbon ion with an energy of 400 MeV per nucleon produces about 5 neutrons on average when being slowed down.

Another basic difference with regard to conventional X-ray therapy installations resides in the higher spatial requirements and the spatial disturbance of the beam generation up to the application of the beam in the patient. Therefore the shielding expenses already of the beam transport system are higher than with conventional installations. Furthermore, the access to the treatment rooms is more difficult since large areas around the therapy unit are occupied by the beam guide structure. Conventional shielding concepts for X-ray irradiation installations utilize mainly the shielding effects of concrete with attenuation lengths (concrete wall thicknesses) which are applicable for MeV neutron radiation.

Radiation protection shields have been developed so far only with the consideration of hydrogen-containing moderators for the utilization of the elastic scattering of neutrons on protons, whose effective cross-sections become smaller with increasing neutron energy.

SUMMARY OF THE INVENTION

Concepts for the shielding of high-energy neutron radiation should, according to the calculations of the inventors, also consider physical processes, such as spallation and fragmentation reactions. The advantage is that they have constant effective cross-sections and constant interaction probabilities for high energies. In comparison with concrete, there are materials which result in changed moderating lengths and which may require less space than concrete shields.

In order to be able to effectively dimension, the therapy units, compact shielding arrangements are of great interest. These include:
  Areas adjacent to the therapy rooms should be so designed that nobody needs to be there over extended periods;
  The therapy room sizes should be limited so that only small areas need to be shielded;
  The shielding itself should be efficient so that relatively little space is required therefor,
  Shielding doors should be relatively small as a result of the previous measure, so they can be moved also without power assistance within an acceptable period.

It is the object of the present invention to provide an efficient and effective shielding arrangement of a relatively small volume.

In a shielded chamber for ion therapy including a therapy room 6 which has a main axis 11 as determined by the direction of a high-energy ion therapy beam 9 surrounded by shielding 1 and includes at said one end a labyrinth entrance with at least two shielding wall sections 14 displaced longitudinally along the main axis and extending into the room from opposite side walls, the wall sections include means for causing spallation of the incident high energy neutrons to thereby generate from the high energy neutrons in the high energy neutron beam a plurality of low energy neutrons which are then moderated.

The solution is based on the principle of a spatially structured multi-layer component shield, that is a combination shield for high energy neutron radiation. Essential is the introduction of a layer 8 which first causes an interaction between high energy neutrons of the neutron radiation cone 10 in spallation reactions with heavy atom nuclei. In this process, several low energy neutrons are generated from a high-energy neutron. These low-energy neutrons can then be absorbed or moderated with conventional hydrogen containing shielding materials, the combination shield is effective in two steps:
  initiation of spallation and fragmentation reactions in the first layer 8;
  absorption of the secondary radiation being generated in the first layer 8, by a second low energy neutron moderating and absorbing layer 2.

In connection with the combination shielding, generally referred to as 14 and comprising said first layer 8 and said second layer 2, (illustrated in FIG. 1 as 14', 14", and 14'"; 8', 8", and 8'"; and 2', 2", and 2'", respectively; and further illustrated in FIG. 3 as 8', 8", and 8'"; and 2', 2", and 2'", respectively) an optimization in various areas of the radiation protection is important.

In spallation reactions, not only neutrons are generated but also nuclear fragments, among them radio nuclides which again are a source of possible radiation.

The selection of the heavy target nuclei determines which spectrum of radio nuclides can be produced. The selection of the heavy target nucleus consequently optimizes the conversion of highly energetic neutrons to low energy neutrons and the generation of beta and gamma radiation emitting radio nuclides. The use of heavy spallation neutron converters such as lead, bismuth, etc., provides for a correspondingly large spectrum of generated radio nuclides some of which have a longer life. Lighter spallation neutron converters have a lower spallation efficiency, but the possibilities and the effective cross-sections for the production of radio nuclides are smaller, since, in accordance with the nuclide map, fewer radio nuclides can be generated. This is an advantage in connection with radiation protection considerations with respect to the exposure to beta and gamma radiation when the accelerator is turned off.

The combination shielding 2, 8 for the patient treatment area 6 can be summarized with measures for the spatial structuring in the following way:
  i) the introduction of combination shields 2, 8, for example, metal 8 with 0.5 to 1 m layer thickness and a hydrogen containing layer 2 of a 1.5 to 2 or 3 m layer thickness, wherein, in the first layer 8, high energy neutron spallation reactions are initiated and neutrons of mostly lower energy are generated which are moderated in the second and further layers 8, for example, 0.5 m Fe and 1.5 m concrete.
  ii) the introduction of transverse webs 4 extending from the ceiling down vertically toward the floor and consisting of concrete for example,
  iii) the introduction of transversely extending walls arranged behind one another,
  iv) a radiation protection door 5 of hydrogen containing substances such as Polyethylene, water, paraffin etc.
  v) another measure comprises a back stray chamber for neutrons with walls in combination shielding 14 and a side exit into the labyrinth, vi) beam stop reinforcements 3 for the location where the primary beam is dumped.

An additional measure is:

a movable cover for example of metal such as Pb for the area in which the primary beam is dumped, in order to shield the gamma radiation emitted by radio nuclides created when the primary ion beam hits the beam stop reinforcements 3 during quality assurance beam operation. The cover can be moved during irradiating procedures into a shield in order to avoid its activation. After shutting off the primary beam 9, the movable cover can be moved.

Further possible measures are:

The mobile shields in the radiation treatment room, so-called set-up walls.

The above measures must be combined in order to achieve the required shielding effects. The use of the combination shielding 14 is part of an optimized radiation protection arrangement.

The individual measures are known in the art or are used in praxis of accelerators in basic research. However in combination for optimizing shielding effects, they are novel. In combination, they reduce the dose of the secondary radiation by about 6 orders in magnitude from the radiation source to the entrance. An important aspect is the reduction of the part of direct radiation from the source as well as the part of stray radiation. Shields used so far for shielding neutron radiation utilize only the prevalent neutron absorption reactions in the shields by moderating incident neutrons via hydrogen containing moderators.

The measures proposed herein provide for a combined interaction in that first, by way of spallation reactions of the incident radiation, neutrons of smaller energy than that of the incident neutrons are generated. These lower energy neutrons are then moderated in a conventional way and absorbed in the shielding by neutron absorption reactions.

Furthermore, new geometric elements for strategic shielding are provided in a labyrinth arrangement, for example the back stray dead end path, for the reduction of the stray radiation.

Depending on the application of the above-mentioned measures, the above-mentioned strategies result in an optimized shielding of the generated neutron and photon radiation under the following aspects:

Reduction of the radiation level caused by direct radiation, that is, non-stray radiation;

Reduction of the stray radiation;

Optimization of the use of the spatial arrangements of the shielding units;

Reduction of the production of radio nuclides by secondary radiation, and reduction of the radiation exposure by the gamma- and beta radiating nuclides generated;

The combination of the first three measures in such a way that for example access shielding door 5 is not strictly required, but may be employed.

The essential advantages of the invention reside in the realization of radiation protection by construction features. Those are:

Optimization of the shielding with regard to material and geometry;

Combination of the optimized measures to fulfill the requirements of the radiation protection regulations with regard to installations for the treatment of Cancer by means of heavy ion therapy using protons, carbon ions and other ions;

The proposed measures are suitable to provide adequate shielding even under the most unfavorable condition wherein the entrance direction to the treatment location of the patient is along the beam axis;

A more efficient and effective moderation of the direct and stray radiation for high energy neutron radiation;

A compact shielding for a two-mode operation in connection with patient irradiation and quality assurance with beam deposition in the shielding wall;

Consideration of the generation of radioactive materials during radiation and the shielding of these materials.

The present prototype planning of a heavy ion therapy installation at a radiological university hospital is based on carbon ion radiation and proton radiation. The plans were examined by the TÜV Süddeutschland (Technical Surveillance Association of Southern Germany) with respect to the shielding arrangements and effects and was approved as to its principal design.

The invention will be described below on the basis of a schematic representation of the horizontal irradiation location of the heavy ion therapy installation designed for this university hospital.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a cross-sectional side view of the heavy ion therapy installation of FIG. 1.

DETAILED DESCRIPTION OF THE INVENTION

Figure 1:
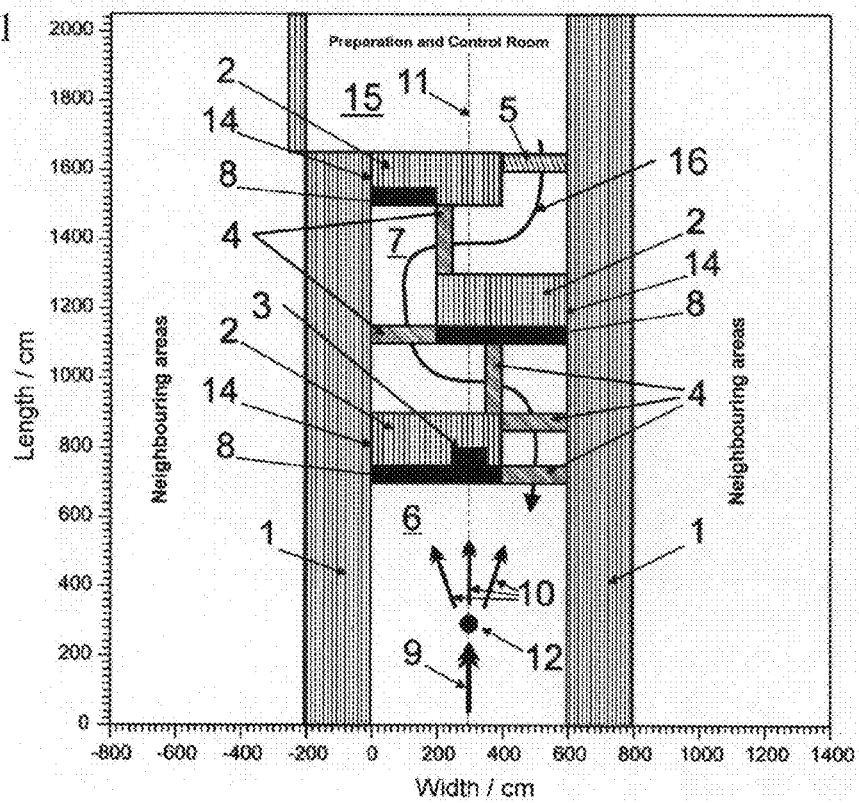
FIG. 1 is a schematic representation of the horizontal irradiation location of the heavy ion therapy installation as designed for the university hospital of Heidelberg, Germany.

The heavy ion therapy installation is operated with either protons, carbon ions, neon ions or heavy ions forming the primary beam for the cancer treatment of patients, thereby producing secondary neutron radiation. The reason for this is the described nuclear physical fragmentation process of the primary ions or of the target nucleus during the moderation procedure of the primary ions in the material, in particular in the patient's tissue being irradiated. For example, per carbon ion with the energy of 400 MeV per nucleon on average 5 neutrons are released. In addition to the beam transportation system from the synchrotron to the patient which involves minimal losses, particularly the area 6 of the patient treatment is a location with relatively high neutron radiation dose.

With the arrangement of such therapy installations, the access to the treatment area 6 is located in some cases opposite the primary beam 9 along the beam path 11, i.e. in zero degree forward direction. The neutrons are emitted spatially in such a way that the main part of the neutron radiation is emitted forwardly peaking in zero degree direction. This requires that the access area 7 includes means which sufficiently attenuate the radiation. (See FIGS. 1 and 2).

The effectiveness of the shielding arrangements for an irradiation location can be determined most accurately by means of radiation transport programs. In the exemplary embodiment, the results of Monte-Carlo radiation transport calculations based on measured neutron spectra are summarized.

The estimation of the radiation level was calculated for the horizontal radiation locations using the radiation program FLUKA on the basis of measured neutron spectra. A carbon ion beam 9 with an energy of 400 MeV per nucleon was considered. As target 12 for the measurements, a graphite block of 100×100×200 mm$^3$ was used. The neutron spectra were measured at the angles 0°, 7.5°, 15°, 30°, 60° and 90°.

There are basically two radiation modes for such therapy installations:

Irradiation of patients where the full primary beam is deposited in the patient.

Verification of irradiation plans for quality assurance wherein the beam may also be deposited in a beam catcher.

For the calculation, the spectra measured with a carbon target were considered as being representative of an exposure of a patient or respectively, the spectra measured with a copper target were considered to be representative of the radiation exposure, for quality assurance measurement programs.

For the FLUKA simulation calculations of the labyrinth, the two geometries are treated as follows:

patient geometry, P;

geometry Q (quality assurance) for control measurements.

Figure 2:
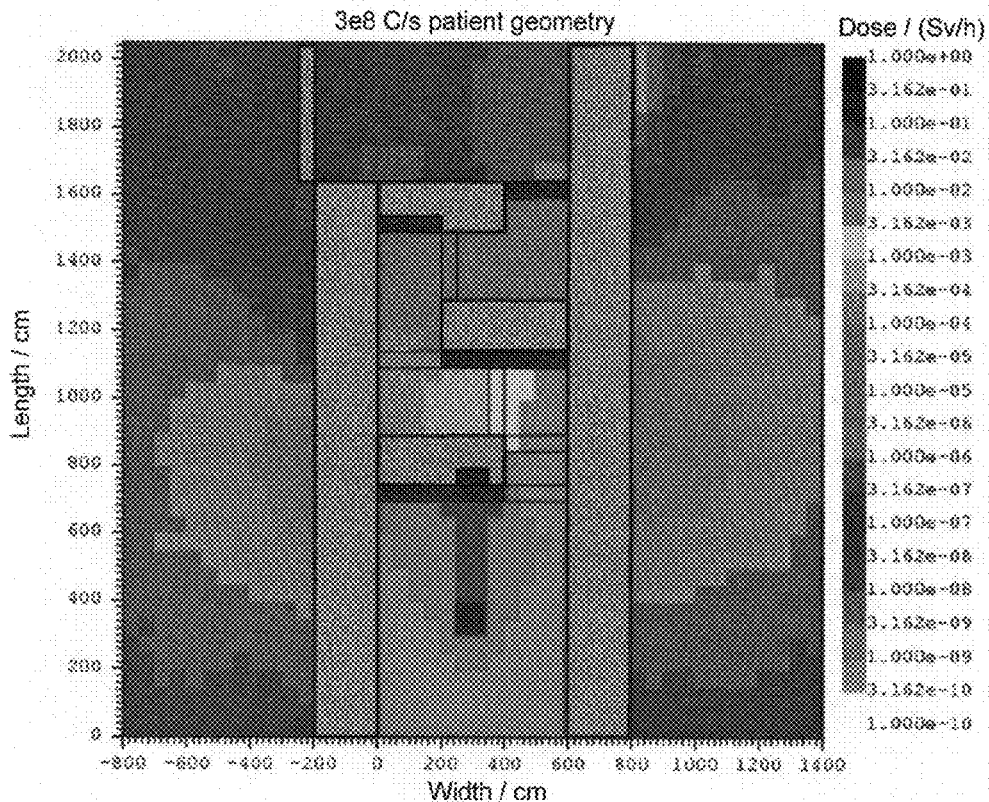
FIG. 2 shows a model of the geometry P for the horizontal irradiation locations by the radiation transport program FLUKA for determining the ambient equivalent dose H*(10) for neutrons.

In the first case, the beam 9 is destroyed in the target 12 about 3.5 m ahead of the first labyrinth wall element 14; in the latter cases, most of the beam is destroyed directly in the first wall element 14 of the labyrinth (see FIGS. 1 and 2).

The neutrons generated are transported through the labyrinth toward the entrance area 7 and the dose generated along the labyrinth is determined. For the intensity of the ion beam, averaged during operation over a 10 min. time interval, maximum values of 10$^7$ ions per second are expected. The theoretical maximum value is at 3×10$^8$ ions per second. For source neutrons which are emitted backwardly, the neutron spectra measured at less than 90° are used.

For optimizing the shielding effect, the following measures are introduced.

labyrinth techniques for reducing the stray radiation;

in addition to conventional concrete shields, the use of combination shieldings 14;

the introduction of transverse webs 4 extending from the ceiling down to a level of 2.5 m in the labyrinth passage 16 in the area of the intermediate walls 14;

local reinforcement 3 of the iron shielding 8 in the first wall of 0.5 m to 1.0 m for the dump function in an area of 1 m$^2$ for quality assurance;

the use of an iron shielding layer 8 also in the third transverse wall (0.5 m), the use of a polyethylene door 5 closing the outer end of the entrance area 7 (0.5 m thickness)

the use of iron shielding in the ceiling area over the target 12 (0.5 m iron).

The determination of the doses concentrates on the entrance area 7 to the labyrinth 16, where the waiting areas 15 for the personnel are and on the adjacent rooms. The dose values are calculated for a primary beam 9 of maximum intensity with 3×10$^8$ ions per second (see FIG. 2).

The table 1 below gives an overview of the calculations performed. Geometry P means patient geometry, geometry Q indicates the radiation for quality assurance measurements. Geometry D means ceiling geometry, in the present case with iron reinforcement of 0.5 m iron as a combination shield instead of a 2 m thick concrete shield above the target location.

The characteristic feature of the planned arrangement—that is the forward straying of the neutron cone 10 into the access area 7—has so far not been taken into consideration in the literature for the kind of radiation treatment installations.

TABLE 1

Overview of the geometries as computed with FLUKA employing the various radiation parameters and geometries.

| Beam | Dose Rate | geometry |
|---|---|---|
| 3 × 10$^8$ | neutrons | P |
| 3 × 10$^8$ | photons | P |
| 1 × 10$^7$ | neutrons | P |
| 3 × 10$^8$ | neutrons | Q |
| 1 × 10$^7$ | neutrons | Q |
| 3 × 10$^8$ | neutrons | D |
| 1 × 10$^7$ | neutrons | D |

| | Listing of Reference Numerals |
|---|---|
| 1 | Shielding walls |
| 2 | Second shield layer (neutron moderation) |
| 3 | Beam stop reinforcement |
| 4 | Webs extending from ceiling |
| 5 | Access shielding door |
| 6 | Treatment area |
| 7 | Access area |
| 8 | First shield layer (initiates spallation) |
| 9 | Primary ion beam |
| 10 | Neutron cone |
| 11 | Primary ion beam central axis |
| 12 | Target |
| 14 | The combination shielding |
| 15 | Preparation and control room |
| 16 | Labyrinth passage |

LITERATURE

[I]. J. Debus; Proposal for a dedicated Ion Beam Facility for Cancer Therapy. DKFZ, GSI and FZR Report 1998

[II]. DIN 6847/Teil 2 (Strahlenschutzregeln für die Errichtung von medizinischen Elektronenbeschleunigeranlagen, Kapitel 8.7, Bemessung der Abschirmung von Neutronenstrahlung), März 1990.

[III]. A. Fasso, K. Goebel, M. Höfert, J. Ranft, G. Stevenson in Landolt-Börnstein, Gruppe 1: Kern- and Teilchenphysik; Band 11: Abschimmung gegen hochenergetische Strahlung, Herausgeber H. Schopper, Springer-Verlag, Berlin, 1990.

[IV]. S. Agosteo; Radiation Protection at Medical Accelerators; Radiation Protection Dosimetrie, Vol. 96 No. 4, 393-406 (2001).

[V]. A. Fasso, A. Ferrari, J. Ranft, P. R. Sala: New developments in FLUKJ modelling hadronic and EM interactions Proc. 3$^{rd}$ Workshop on Simulating Accelerator Radiation Environments, KEK, Tsukuba (Japan) 7-9 May 1997. Ed. H. Hirayama, KEK Proceedings 97-5 (1997), p. 32-4

What is claimed is:

1. A treatment facility comprising a shielded chamber for use in conjunction with an ion therapy beam, wherein the shielded chamber comprises:

two opposed side walls;

an entrance to the shielded chamber, wherein the entrance is defined between the opposed side walls at a first end of the shielded chamber;

a treatment room for a patient to be exposed to the ion therapy beam, wherein the treatment room is defined between the opposed side walls at a second end of the shielded chamber;

a shielding door at the entrance to the shielded chamber, wherein the shielding door comprises a layer of hydrogen-containing material; and a labyrinthine passage to enter and exit the treatment room, wherein the labyrinthine passage leads from the entrance of the shielded chamber to the treatment room and is defined by at least a first labyrinth wall and a second labyrinth wall that:

(a) extend transversely inward, one from each side wall;
(b) are longitudinally displaced with respect to each other along the side walls, wherein the first labyrinth wall is closer to the treatment room than the second labyrinth wall;
(c) each cross a central axis that aligns with peak propagation of the ion therapy beam when a patient is being irradiated thereby in the treatment room; and
(d) each comprise at least two layers of shielding, including:
  (i) a spallation layer for causing spallation reactions wherein incident relatively high-energy neutrons interact with atomic nuclei to generate relatively low-energy neutrons, wherein the spallation layer of the first labyrinth wall and the spallation layer of the second labyrinth wall overlap each other; and
  (ii) a neutron moderating and absorbing layer for moderating and absorbing the relatively low-energy neutrons generated in the spallation reactions in the spallation layer, wherein the neutron moderating and absorbing layer of the first labyrinth wall and the neutron moderating and absorbing layer of the second labyrinth wall overlap each other.

2. The treatment facility of claim 1, wherein the labyrinthine passage comprises a third labyrinth wall that extends transversely inward from one of the side walls sufficiently to cross the central axis.

3. The treatment facility of claim 1 further comprising a preparation or control room that is disposed adjacent to the entrance to the shielded chamber and that crosses the central axis.

4. The treatment facility of claim 3 wherein the ion therapy beam is a carbon ion beam at 400 MeV/u with a maximum value of $10^7$ carbon ions per second, based on a ten minute average, and
wherein the first and second labyrinth walls have a thickness suitable for reducing neutron radiation to less than 10 μSv/h behind the second labyrinth wall along the central axis, thereby enabling use of the preparation or control room during ion therapy of a patient in the shielded chamber.

5. The treatment facility of claim 1, wherein the spallation layer of the first labyrinth wall comprises iron of at least 0.5 meters thickness and the neutron moderating and absorbing layer of the first labyrinth wall comprises concrete of at least 1.5 meters thickness.

6. The treatment facility of claim 1, wherein the entrance has a concrete ceiling and further comprises a plurality of concrete cross webs downwardly extending from the concrete ceiling within the labyrinthine passage.

7. The treatment facility of claim 1, wherein the first labyrinth wall further comprises an iron beam dump located along the central axis and having a thickness of about 0.5 meter to about 1.0 meter.

8. The treatment facility of claim 1, wherein the second labyrinth wall comprises the spallation material in an area that is not shadowed by the first labyrinth wall, as seen from the location of the patient when receiving ion therapy.

9. The treatment facility of claim 1, wherein each of the first labyrinth wall and the second labyrinth wall extend inwardly by at least half of the distance between the side walls thereby overlapping one another.

10. The treatment facility of claim 1, wherein the spallation layer of the second labyrinth wall extends inwardly from the respective side wall across the central axis.

11. The treatment facility of claim 2, wherein the third labyrinth wall:
(a) is longitudinally displaced with respect to the second labyrinth wall along the side walls, wherein the second labyrinth wall is closer to the treatment room than the third labyrinth wall; and
(b) comprises at least two layers of shielding, including:
  (i) a spallation layer for causing spallation reactions wherein incident relatively high-energy neutrons interact with atomic nuclei to generate relatively low-energy neutrons; and
  (ii) a neutron moderating and absorbing layer for moderating and absorbing the relatively low-energy neutrons generated in the spallation reactions in the spallation layer, wherein the neutron moderating and absorbing layer of the third labyrinth wall and the neutron moderating and absorbing layer of the second labyrinth wall overlap each other.

12. A treatment facility comprising a shielded chamber for use in conjunction with an ion therapy beam, wherein the shielded chamber comprises:

two opposed side walls;
an entrance to the shielded chamber, wherein the entrance is defined between the opposed side walls at a first end of the shielded chamber;
a treatment room for a patient to be exposed to the ion therapy beam, wherein the treatment room is defined between the opposed side walls at a second end of the shielded chamber; and
a labyrinthine passage to enter and exit the treatment room, wherein the labyrinthine passage leads from the entrance of the shielded chamber to the treatment room and is defined by at least a first labyrinth wall and a second labyrinth wall that:
(a) extend transversely inward, one from each side wall;
(b) are longitudinally displaced with respect to each other along the side walls, wherein the first labyrinth wall is closer to the treatment room than the second labyrinth wall;
(c) each cross a central axis that aligns with peak propagation of the ion therapy beam when a patient is being irradiated thereby in the treatment room; and
(d) each comprise at least two layers of shielding, including:
  (i) a spallation layer for causing spallation reactions wherein incident relatively high-energy neutrons interact with atomic nuclei to generate relatively low-energy neutrons, wherein the spallation layer of the first labyrinth wall and the spallation layer of the second labyrinth wall overlap each other; and
  (ii) a neutron moderating and absorbing layer for moderating and absorbing the relatively low-energy neutrons generated in the spallation reactions in the spallation layer, wherein the neutron moderating and absorbing layer of the first labyrinth wall and the neutron moderating and absorbing layer of the second labyrinth wall overlap each other;
wherein the spallation layer of the first labyrinth wall comprises iron of at least 0.5 meters thickness and the neutron moderating and absorbing layer of the first labyrinth wall comprises concrete of at least 1.5 meters thickness.

13. A treatment facility comprising a shielded chamber for use in conjunction with an ion therapy beam, wherein the shielded chamber comprises:
- two opposed side walls;
- an entrance to the shielded chamber, wherein the entrance is defined between the opposed side walls at a first end of the shielded chamber;
- a treatment room for a patient to be exposed to the ion therapy beam, wherein the treatment room is defined between the opposed side walls at a second end of the shielded chamber; and
- a labyrinthine passage to enter and exit the treatment room, wherein the labyrinthine passage leads from the entrance of the shielded chamber to the treatment room and is defined by at least a first labyrinth wall and a second labyrinth wall that:
  (a) extend transversely inward, one from each side wall;
  (b) are longitudinally displaced with respect to each other along the side walls, wherein the first labyrinth wall is closer to the treatment room than the second labyrinth wall;
  (c) each cross a central axis that aligns with peak propagation of the ion therapy beam when a patient is being irradiated thereby in the treatment room; and
  (d) each comprise at least two layers of shielding, including:
    (i) a spallation layer for causing spallation reactions wherein incident relatively high-energy neutrons interact with atomic nuclei to generate relatively low-energy neutrons, wherein the spallation layer of the first labyrinth wall and the spallation layer of the second labyrinth wall overlap each other; and
    (ii) a neutron moderating and absorbing layer for moderating and absorbing the relatively low-energy neutrons generated in the spallation reactions in the spallation layer, wherein the neutron moderating and absorbing layer of the first labyrinth wall and the neutron moderating and absorbing layer of the second labyrinth wall overlap each other;
- wherein the entrance has a concrete ceiling and further comprises a plurality of concrete cross webs downwardly extending from the concrete ceiling within the labyrinthine passage.

14. A treatment facility comprising a shielded chamber for use in conjunction with an ion therapy beam, wherein the shielded chamber comprises:
- two opposed side walls;
- an entrance to the shielded chamber, wherein the entrance is defined between the opposed side walls at a first end of the shielded chamber;
- a treatment room for a patient to be exposed to the ion therapy beam, wherein the treatment room is defined between the opposed side walls at a second end of the shielded chamber; and
- a labyrinthine passage to enter and exit the treatment room, wherein the labyrinthine passage leads from the entrance of the shielded chamber to the treatment room and is defined by at least a first labyrinth wall and a second labyrinth wall that:
  (a) extend transversely inward, one from each side wall;
  (b) are longitudinally displaced with respect to each other along the side walls, wherein the first labyrinth wall is closer to the treatment room than the second labyrinth wall;
  (c) each cross a central axis that aligns with peak propagation of the ion therapy beam when a patient is being irradiated thereby in the treatment room; and
  (d) each comprise at least two layers of shielding, including:
    (i) a spallation layer for causing spallation reactions wherein incident relatively high-energy neutrons interact with atomic nuclei to generate relatively low-energy neutrons, wherein the spallation layer of the first labyrinth wall and the spallation layer of the second labyrinth wall overlap each other; and
    (ii) a neutron moderating and absorbing layer for moderating and absorbing the relatively low-energy neutrons generated in the spallation reactions in the spallation layer, wherein the neutron moderating and absorbing layer of the first labyrinth wall and the neutron moderating and absorbing layer of the second labyrinth wall overlap each other;
- wherein the second labyrinth wall comprises the spallation material in an area that is not shadowed by the first labyrinth wall, as seen from the location of the patient when receiving ion therapy.

* * * * *